(12) United States Patent
Shaw et al.

(10) Patent No.: US 10,609,180 B2
(45) Date of Patent: Mar. 31, 2020

(54) FACILITATING DYNAMIC ESTABLISHMENT OF VIRTUAL ENTERPRISE SERVICE PLATFORMS AND ON-DEMAND SERVICE PROVISIONING

(71) Applicant: AT&T Intellectual Property I, LP, Atlanta, GA (US)

(72) Inventors: Venson Shaw, Kirkland, WA (US); Sangar Dowlatkhah, Alpharetta, GA (US); Jeffrey Joseph Farah, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 448 days.

(21) Appl. No.: 15/229,353

(22) Filed: Aug. 5, 2016

(65) Prior Publication Data

US 2018/0041607 A1    Feb. 8, 2018

(51) Int. Cl.
*H04L 29/08* (2006.01)
*H04L 12/911* (2013.01)
*H04L 12/24* (2006.01)
*H04L 12/927* (2013.01)

(52) U.S. Cl.
CPC ........ *H04L 67/322* (2013.01); *H04L 41/0896* (2013.01); *H04L 41/5025* (2013.01); *H04L 41/5051* (2013.01); *H04L 47/805* (2013.01); *H04L 47/825* (2013.01); *H04L 67/2804* (2013.01); *H04L 41/0893* (2013.01)

(58) Field of Classification Search
CPC ... H04L 41/5019; H04L 47/825; H04L 49/70; H04L 67/2804; H04L 67/322; H04L 47/805; H04L 41/0893; H04L 41/0896; H04L 41/5025; H04L 41/5051
USPC .................................................. 709/223, 226
See application file for complete search history.

(56) References Cited

U.S. PATENT DOCUMENTS

| | | | |
|---|---|---|---|
| 6,115,646 A | 9/2000 | Fiszman et al. | |
| 6,460,082 B1 | 10/2002 | Lumelsky et al. | |
| 6,516,350 B1 | 2/2003 | Lumelsky et al. | |
| 6,578,068 B1 | 6/2003 | Bowman-amuah | |

(Continued)

FOREIGN PATENT DOCUMENTS

| CN | 103858118 A | 6/2014 |
|---|---|---|
| WO | WO 2015/164668 A2 | 10/2015 |

OTHER PUBLICATIONS

Akbari et al.; "Application of Intelligent Agents to Seamless Business: Design of a Smart Business"; Institute for Trade Studies and Research; 7 pages.

(Continued)

*Primary Examiner* — Michael C Lai
(74) *Attorney, Agent, or Firm* — BakerHostetler (57) ABSTRACT

A method includes exchanging metadata with a network customer during a first provision of a first service to the network customer. The method also includes receiving a request for a second service from the network customer and determining a quality-of-service requirement based on the metadata and a provider of at least one of the first service or the second service. The method also includes adjusting a network resource based on the quality-of-service requirement. The network resource facilitates a second provision of the second service to the network customer.

18 Claims, 4 Drawing Sheets

(56) References Cited

U.S. PATENT DOCUMENTS

| | | |
|---|---|---|
| 6,980,511 B1 * | 12/2005 | Li ................. H04L 41/0896 370/230 |
| 7,467,198 B2 | 12/2008 | Goodman et al. |
| 7,685,251 B2 | 3/2010 | Houlihan et al. |
| 7,725,559 B2 | 5/2010 | Landis et al. |
| 7,882,216 B2 | 2/2011 | Houlihan et al. |
| 8,108,855 B2 | 1/2012 | Dias et al. |
| 8,327,350 B2 | 12/2012 | Chess et al. |
| 8,429,630 B2 | 4/2013 | Nickolov et al. |
| 8,782,322 B2 | 7/2014 | Houlihan et al. |
| 8,918,835 B2 | 12/2014 | Ravindran et al. |
| 9,210,100 B2 | 12/2015 | Van et al. |
| 9,239,996 B2 | 1/2016 | Moorthi et al. |
| 9,432,519 B1 * | 8/2016 | Liu ................. H04M 15/56 |
| 9,628,436 B1 * | 4/2017 | Britt ................. H04L 61/1511 |
| 2004/0203658 A1 * | 10/2004 | Narayanan ........... H04W 28/24 455/414.1 |
| 2005/0234969 A1 | 10/2005 | Mamou et al. |
| 2007/0180451 A1 | 8/2007 | Ryan et al. |
| 2009/0059937 A1 * | 3/2009 | Kanada ............... H04L 41/5003 370/401 |
| 2012/0016995 A1 * | 1/2012 | You ................. H04L 12/14 709/226 |
| 2012/0239739 A1 | 9/2012 | Manglik et al. |
| 2013/0097597 A1 | 4/2013 | Gibson et al. |
| 2013/0346617 A1 | 12/2013 | Hotes et al. |
| 2014/0040343 A1 | 2/2014 | Nickolov et al. |
| 2014/0324862 A1 | 10/2014 | Bingham et al. |
| 2015/0200958 A1 | 7/2015 | Muppidi et al. |

OTHER PUBLICATIONS

Brown et al.; "A Workflow-based Network Advisor for Data Movement with End-to-end Performance Optimization"; IEEE High Performance Computing, Networking, Storage and Analysis; 2012; 9 pages.

Chen et al.; "Enabling Technologies for Future Data Center Networking: A Primer"; IEEE Network; Jul./Aug. 2013; p. 8-15.

Zhang et al.; "HELM: Conflict-Free Active Measurement Scheduling for Shared Network Resource Management"; IEEE Integrated Network Management; 2015; 9 pages.

\* cited by examiner

FACILITATING DYNAMIC ESTABLISHMENT OF VIRTUAL ENTERPRISE SERVICE PLATFORMS AND ON-DEMAND SERVICE PROVISIONING

TECHNICAL FIELD

The subject disclosure relates generally to telecommunications and to systems, apparatuses and methods of using metadata for dynamic instantiation of virtual enterprise service platforms (ESPs), on-demand provision of services or content, or dynamic allocation of network resources.

BACKGROUND

A service provider may use a backbone network to deliver content, applications, or services from an application server to an ESP or a customer site. However, such systems may not have the flexibility to provide content, applications, or services based on dynamic or customer-specific requirements. This disclosure is directed at solving one or more of these shortcomings.

SUMMARY

Various embodiments may include systems, apparatus, methods or computer-readable storage media that facilitate dynamic resource allocation for virtual local ESPs.

In an aspect, this disclosure is directed to a system. The system may include a network resource and a resource controller communicatively coupled to the network resource. The system may also include a metadata exchange storing metadata associated with a network customer. The metadata exchange may be communicatively coupled to the resource controller. The system may also include memory storing instructions that cause the resource controller to execute operations. The operations may include detecting a request from a network customer and identifying a first metadata of the metadata based on at least an identity of the network customer. The operations may also include determining a quality-of-service requirement based on the request and the first metadata. The operations may also include adjusting the network resource based on the quality-of-service requirement.

According to another aspect, this disclosure is directed to a method. The method may include detecting a request from a network customer and identifying a first metadata of the metadata based on at least an identity of the network customer. The method may also include determining a quality-of-service requirement based on the request and the first metadata. The method may also include adjusting the network resource based on the quality-of-service requirement.

According to yet another aspect, this disclosure is directed to a method. The method may include exchanging metadata with a network customer during a first provision of a first service to the network customer. The method may also include receiving a request for a second service from the network customer and determining a quality-of-service requirement based on the metadata and a provider of at least one of the first service or the second service. The method may also include adjusting a network resource based on the quality-of-service requirement. The network resource may facilitate a second provision of the second service to the network customer.

DETAILED DESCRIPTION

One or more aspects of the technology are described below with reference to the drawings, wherein like reference numerals may be used to refer to like elements throughout where convenient. In the following description, for purposes of explanation, numerous specific details are set forth in order to provide a thorough understanding of the various aspects and implementations of the disclosed technology. It is evident, however, that different aspects and implementations of the disclosed technology may be practiced without these specific details (and without applying to any particular networked environment or standard).

As used herein, the terms "exemplary" and "example" are used to identify an instance or illustration. An aspect of the technology described herein as "example" or "exemplary" is not necessarily to be construed as preferred or advantageous over other aspects. Rather, "example" and "exemplary" presents concepts in a concrete fashion. As used in this application, the term "or" is intended to be inclusive rather than exclusive. That is, unless specified otherwise or clear from context, "X includes A or B" is intended to mean any of the natural inclusive permutations: X includes A but not B; X includes B but not A; or X includes A and B. In addition, the articles "a" and "an" as used in this application and the appended claims should generally be construed to mean "one or more" unless specified otherwise or clear from context to be directed to a singular form.

Figure 1:
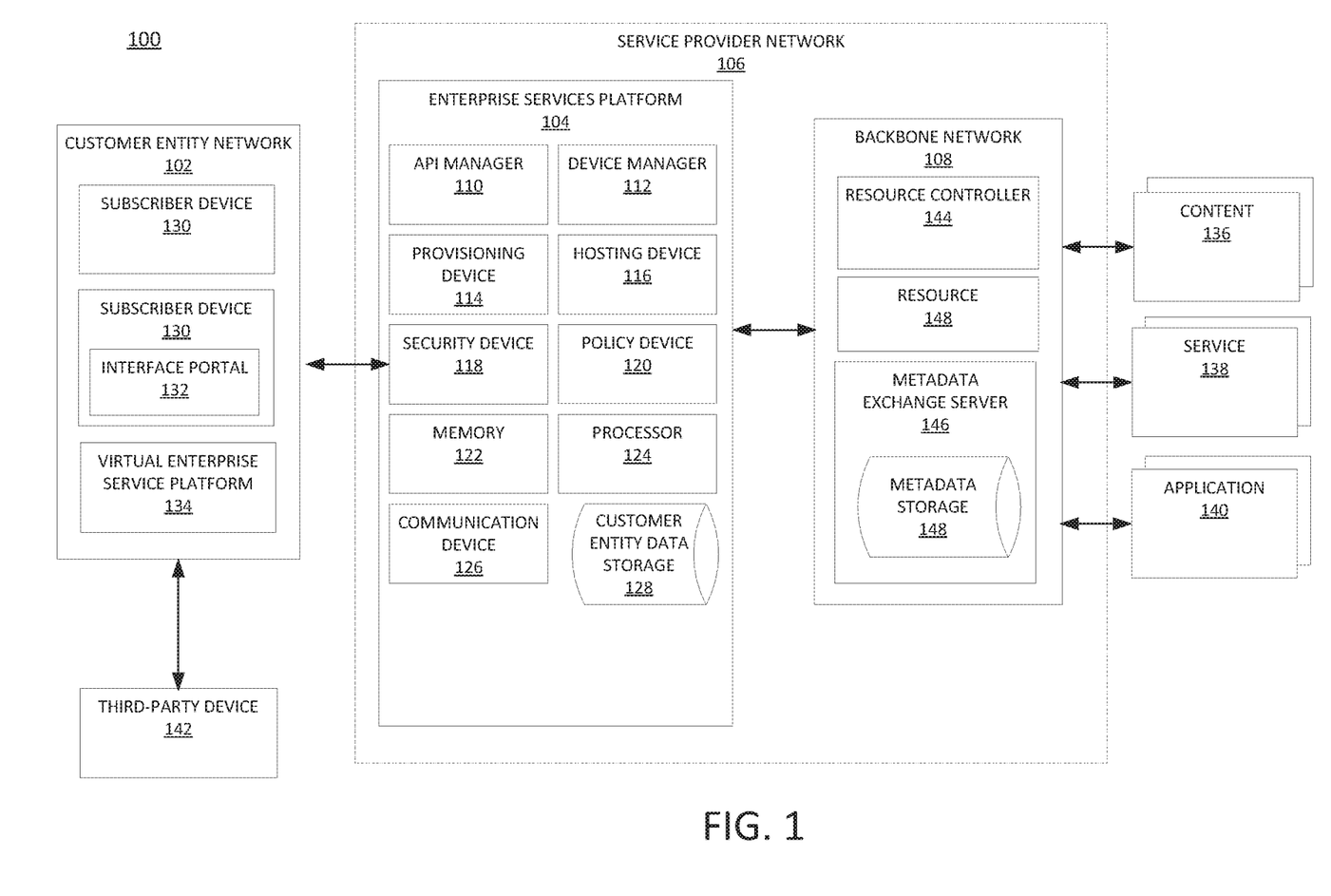
FIG. 1 is a schematic of an exemplary system that may be used to dynamically establish virtual ESPs, dynamically allocate network resources, or provide services, content, or applications.

FIG. 1 illustrates an exemplary system 100 that may be used to dynamically establish virtual ESPs or dynamically allocate resources. System 100 may include one or more customer entity networks 102. In an aspect, each customer entity network 102 may include software or hardware located at customer entity's premises or communicatively coupled to a component at the customer entity's premises. Each customer entity network 102 may be communicatively coupled to an ESP 104 that may facilitate communications between customer entity network 102 to an enterprise network, such as service provider network 106. In an aspect, ESP 104 may be configured to store information for or provide service to multiple customer entities 102. Service provider network 106 may include or be communicatively coupled to ESP 104. Additionally or optionally, service provider network 104 may include a backbone network 108.

Customer entity network 102 and service provider network 106 may be any of a number of different types of networks that facilitate communication. For example, customer entity network 102 or service provider network 106 may include any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third-generation partnership project (3GPP), long term evolution (LTE), evolved pack core (EPC), third-generation partnership project 2 (3GPP2), ultra mobile broadband (UMB), high speed packet access (HSPA), Zigbee, other 802.XX wireless technologies, or legacy telecommunication technologies.

ESP 104 may comprise software or hardware that may be used to facilitate provision of network services to customer entity network 102. ESP 104 may include various functionality, services, product management tools, or dedicated repositories. Optionally, ESP 104 may serve as a master controller platform with capability of creating, instantiating, or generating on-demand virtual ESPs locally in customer entity networks (e.g., customer entity network 102).

As shown, ESP 104 may include different components to establish one or more virtual ESPs at the customer entity network 102 or to provide on-demand services to customer entity network 102. For example, ESP 104 may include an API manager 110, a device manager 112, a provisioning device 114, a hosting device 116, a security device 118, a policy device 120, a memory 122, a processor 124, a communications device 126, or a customer entity data storage 128. In an aspect, one or more components of ESP 104 may be electrically or communicatively coupled to one another to perform one or more functions of ESP 104.

Customer entity network 102 may include or be communicatively coupled to one or more subscriber devices 130. In an aspect, subscriber devices 130, may be operated by the customer entity, employees of the customer entity, or subscribers of the customer entity. Optionally, subscriber device 130 may include an interface portal 132, such as a graphical user interface or an HTTP-based portal that may display or output information or configuration options. In an aspect, subscriber device 130 including interface portal 132 may be a system device for the customer entity (e.g., a device to which administrators for the customer entity have access for control of the various functionalities customer entity network 102). Interface portal 132 may display or output information or options that may be used to generate or configure a virtual ESP 134 on customer entity network 102 that customer entity may use to communicate with service provider network 106. Additionally or alternatively, customer entity network 102 may communicate directly with ESP 104 for on-demand service provisioning.

Virtual ESP 134 may be tailored to include the specific services or applications that may be used or desirable for subscriber devices 130. In an aspect, virtual ESP 134 may be established on a universal platform that communicates directly or indirectly with ESP 104. Virtual ESP 134 may vary in size, complexity, or functionality over time. For example, the virtual ESP 134 may be elastic such that different services or functionalities may be added to or removed on demand and, in some embodiments, in substantially real-time, such as based on a request generated by the customer entity via interface portal 132.

Virtual ESP 134 may reduce service establishment time, capital and operational expenditures spending for customer entity or the service provider, or enable the service provider to test services that are tailored to a customer entity without substantial investment. Service providers may deliver, establish, or otherwise rollout tailored services, such in response to requests transmitted via interface portal 132.

In this regard, the components, services, or applications of virtual ESP 134 may be similar or identical to one or more elements of ESP 104. Virtual ESP 134 may include a subset of the elements of ESP 104. Accordingly, one or more elements of ESP 104 may be virtualized within customer entity network 102. For example, software related to operation of one or more applications may be stored and executed by subscriber device 130.

The software of the application that instantiates virtual ESP 134 may be stored on hardware associated with one or more components of customer entity network 102. For example, software may be loaded on subscriber device 130 that has a defined hypervisor, such as a virtual machine monitoring device that creates or runs virtual machines. Subscriber device 130 having a hyperviser may host all or part of virtual ESP 134. In an aspect, the hypervisor may present the guest operating systems with a virtual operating platform and manage the execution of the guest operating systems. Multiple instances of a variety of operating systems may share the virtualized hardware resources.

Similar to loading the software to the hardware that has the predefined hypervisor, the same may be done to a transport and backhaul network with virtual provider edge and customer entity edge for a particular customer entity in a multiprotocol label-switching (MPLS) network. Accordingly, A VPN may be created in the same instance virtual ESP 134 is instantiated. As such, ESP 104 may instantiate one or more dedicated, tailored services using a single platform to execute and store information related to those services. ESP 104 may synchronize information generated or collected by virtual ESP 134 with a master platform (e.g., ESP 104) in service provider network 104.

As such, if the customer entity requests installation of another service (e.g., performed via entry of information at interface portal 132), this virtual service may be installed within a few seconds or a few minutes, and that service may be customized to address the needs of the customer entity employing the service provider network 106. Accordingly, ESP 104 may enable the customer entity to have a dedicated portal device at the customer entity premises within customer entity network 102 to one or more devices that are being serviced by the service provider at network 106. For example, devices may include customer entity cell phones, tablets, or machine-to-machine devices, such as thermostats or other sensors. The service provider may offer the customer entity a number of services either within the same virtual ESP 134 or by creating a new virtual ESP 134, such that the customer entity may have multiple virtual ESPs 134 in customer entity network 102.

Subscriber device 130 may comprise an x86 platform system with a hypervisor and service provider software that a virtual service will run on top of the hypervisor. One or more services or functionalities may be tailored for the one or more services stored in ESP 104 (or API manager 110) that may generate or output information detailing the APIs to be selected or additional processing to be performed, such as upon selection of the service at subscriber device 130).

ESP 104 may then serve as a component for facilitating on-demand service provisioning for the customer entity. For example, subscriber device 130 may request that ESP 104 provide services, applications, or content. For example, ESP 104 may add, remove, or further tailor services associated with one or more subscriber devices 130.

API manager 110 of ESP 104 may receive the information or generate the output of the inquiries via interface portal 132 and process information or answers to the inquiries received via interface portal 132. For example, if customer entity network 102 provides access to API manager 110, API manager 110 may survey customer entity network 102 or otherwise determine various conditions of customer entity network 102, such as the number of subscriber devices 130 associated with customer entity network 102, without need for data to be entered at or received via interface portal 132 or to result in a more efficient and accurate information retrieval process.

API manager 110 may process the information obtained or determined about the customer entity network 102. Access to such information may be controlled by the customer entity. For example, the customer entity may authorize such access via one or more permissions established with or saved in the policies or security rules at instantiation or during operation of virtual ESP 134. API manager 110 may cause virtual ESP 134 to be instantiated on customer entity network 102 based on the processed information. Accordingly, the set or subset of functionality provided via virtual ESP 134 may be based on the processed information. API manager 110 may instantiate one or more virtual ESPs 134 at a single customer entity network 102.

API manager 110 (or a local API manager that is part of virtual ESP 134) may perform different functions, such as selection of one or more APIs for provisioning content 136, a service 138, or application 140 via service provider network 106. API manager 110 may provide a third-party device 142 access to virtual ESP 134. API manager 110 may determine that a particular third-party associated with third-party device 142 is authorized by the customer entity to have access to customer entity information (e.g., information about or generated by the customer entity, about or generated by one or more applications or devices associated with the customer entity such as that shown and later described with reference to FIGS. 5 and 6).

Third-party devices 142 may be associated with a particular customer entity. As such, a customer entity may have vendors or service providers (e.g., Verizon) that may access information of the customer entity. For example, if a particular customer entity has an assembly line and a sensor associated with or coupled to the assembly line may output information that indicates the particular customer entity has a low quantity of a particular part needed or employed on the assembly line. The sensor information may be transmitted to or accessed by customer entity data storage 128 of ESP 104 or local customer entity data storage of virtual ESP 134. Third-party device 142 may have third-party API access to the customer entity information (e.g., particular part is low quantity). In this manner, the third-party vendor may be alerted to ship the part to the customer entity according to the information stored in or received by customer entity data storage 128. The third-party may have access to this information based on instructions issued by the API manager 110 (or the local API manager of virtual ESP 134). The customer entity may specify types or amounts of different information that different vendors or carriers may access. API manager 110 may determine which API should be provided to which customer entity, third-party, or the like to achieve the policy that the customer entity has requested for storage in or implementation by policy device 120.

Instantiation of virtual ESP 134 may be initiated within several seconds or minutes after the request is generated at interface portal 132. As such, virtual ESP 134 may be virtualized over a network without delivery of physical components or in-person configuration or installation of components at the customer entity's premises. Accordingly, on-demand, substantially real-time instantiation of virtual ESP 134 at a customer entity network 102 may be accomplished.

After instantiation of virtual ESP 134 or based on access, by the customer entity network 102, of ESP 104, interface portal 132 may display or output one or more indicators that describe one or more services that may be promoted or related to customer entity.

Interface portal 134 may receive information selecting one or more displayed options and thereby choosing one or more services or actions to be taken with regard to the one or more services. For example, the information selected may be indicative of one or more actions to be taken for service provisioning at customer entity network 102. Accordingly, the service provisioning may include adding a new service to customer entity network 102; adding a new service to an existing service already provided to customer entity network 102 (e.g., adding selected bandwidth or display options for existing video conferencing services); removing a service from customer entity network 102; or removing one or services from an existing service (e.g., removing billing monitoring services from existing video conferencing services).

Interface portal 134 may receive an input indicative of a request to add a service to customer entity network 102, or one or more of customer entity devices 130. For customer entity networks 102 that do not include a virtual ESP 134, In an embodiment in which the customer entity does not have a virtual ESP 134, API manager 110 may receive the request generated from interface portal 132. For customer entity networks 102 that include a virtual ESP 134, virtual ESP 134 may receive the request generated from interface portal 132.

API manager 110 or virtual ESP 134 may evaluate the request and transmit an API request for the specific type of service requested to be added, removed, or altered. API manager 110 (or virtual ESP 134) may transmit the API request to one or more devices of ESP 104, virtual ESP 134 or other components of service provider network 106.

Service provider network 106 may dynamically allocate or adjust a resource 148 of backbone network 108. For example, backbone network 108 may include a resource controller 144 that may receive a query or notification when the customer instantiates a service, application, or content delivery request. For example, the query or notification may be received or generated by virtual ESP 134 or ESP 104. Service provider network 106 or ESP 104 may relay the query or notification to resource controller 144. Resource controller 144 may allocate or adjust resources 148 of backbone network 104.

Resource controller 144 may be communicatively coupled to a metadata exchange server 146 that includes or may communicate with a metadata storage 148. Resource controller 144 may allocate or adjust resources 148 of backbone network 108 based on information received from metadata exchange server 146.

Figure 2:
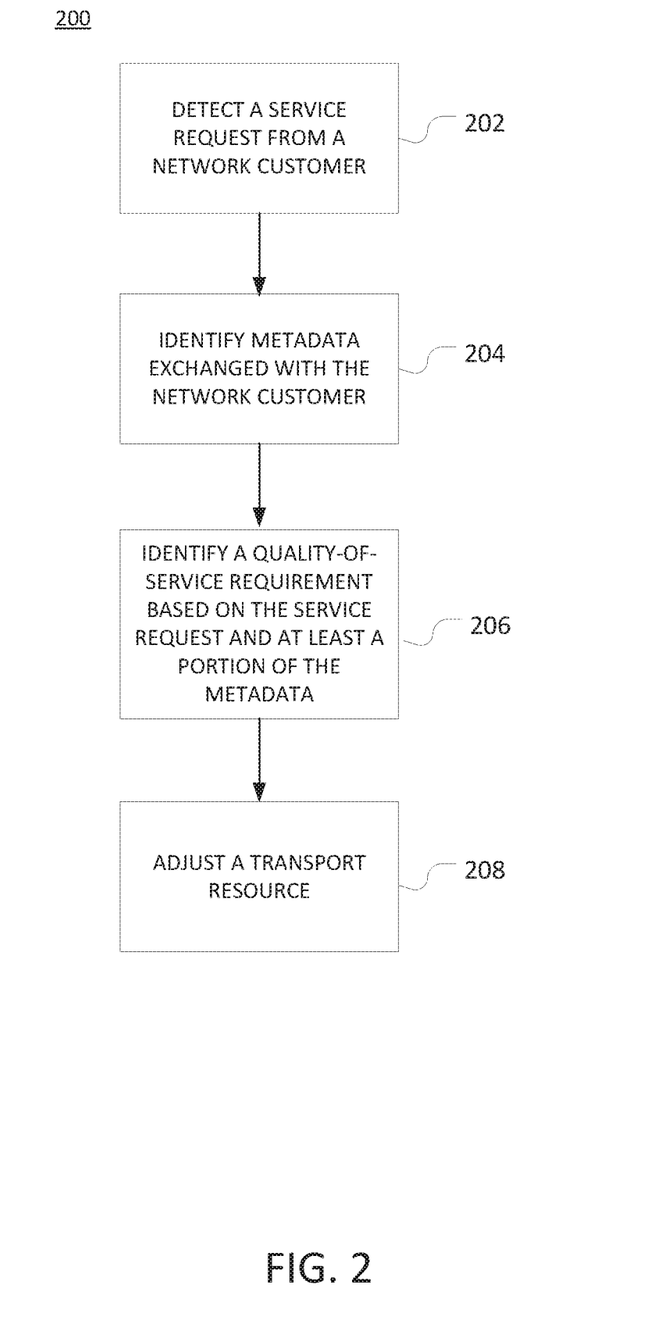
FIG. 2 is a flowchart of an exemplary method for adjusting a transport resource.

FIG. 2 illustrates an exemplary method 200 that may be used by backbone network 104. For example, all or a portion of method 200 may be performed by resource controller 144. In an aspect, step 202 may include detecting a request from a network customer. For example, the request may be generated by or otherwise related to customer entity network 102. For example, the request may be received from virtual ESF 134. The request may relate to or identify a service, an application, or a content. The request may indicate that the service, application, or content be adjusted, removed from, provided to, or installed on customer entity network 102. The request may identify or indicate a provider of the service, application, or content.

At step 204, method 200 may include identifying metadata based on at least an identity of the customer entity network 102. Metadata may include data exchanged between customer entity network 102 and service provider network 106. Metadata may include a location or a time. For example, the location may be a location of the customer entity network 102 or the location the service, application, or content. The time may be a time of day, a day of the week, or another time measurement associated with the request. The metadata may include a customer preference associated with customer entity network 102. The metadata may include user-defined policy rules, where a user may be associated with the customer entity network 102 or the service provider network 106. The metadata may include data based on a service level agreement or a quality-of-service (QoS) requirement of the customer entity or its network 102. A QoS requirement may include one or more of a transport capacity, latency, packet loss, packet loss rate, bandwidth, priority, data associated with a service matrix, or any other QoS requirement.

At step 206, method 200 may include determining a QoS requirement based on the request and the metadata. For example, this may include determining a first QoS requirement associated with the provider of the service, application, or content. Then, this QoS requirement may be adjusted based on the metadata. For example, a QoS requirement of the network customer may be greater than the QoS requirement of the provider, and the QoS at which the request will be answered may depend on these factors.

At step 206, method 200 may include adjusting network resource 148 based on the QoS requirement. Adjusting a network resource may include adjusting the allocation of memory, processing power, or other resources to the network customer or to another customer. Adjusting the network resource may be further based on policy and charging rules function (PCRF) data or similar data associated with the network customer, the provider, the application, the service, or the content. The network resource may belong to a multiprotocol label switching (MPLS) network, such as backbone network 108.

Method 200 may include other functionality. For example, method 200 may include detecting a network change. The network change may be defined as any change in the network, a threshold being met, or a subset of network changes. Method 200 may include adjusting a second network resource 148 during provision of a response to the request, such as during provision of the application, the service, or the content by the network resource.

Figure 3:
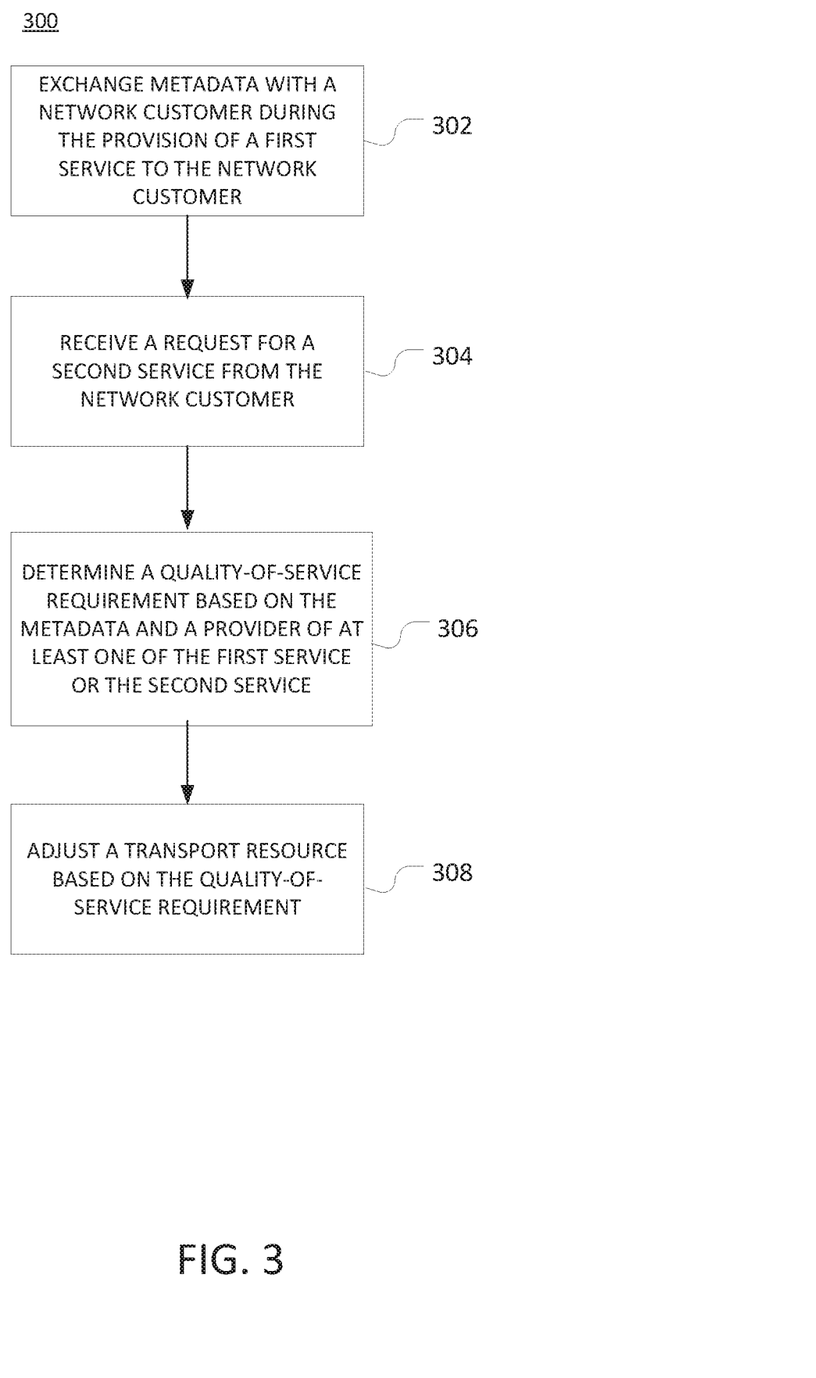
FIG. 3 is a block diagram of an exemplary application programming interface (API) management function device that may be incorporated into the ESP systems of FIGS. 1 and 2.

FIG. 3 illustrates a flowchart of an exemplary method 300. At step 302, method 300 may include exchanging metadata with a network customer, like customer entity network 102, during a first provision of a first service to the network customer. Metadata may include data exchanged between customer entity network 102 and service provider network 106. Metadata may include a location or a time. For example, the location may be a location of the customer entity network 102 or the location the service, application, or content. The time may be a time of day, a day of the week, or another time measurement associated with the request. The metadata may include a customer preference associated with customer entity network 102. The metadata may include user-defined policy rules, where a user may be associated with the customer entity network 102 or the service provider network 106. The metadata may include data based on a service level agreement or a quality-of-service (QoS) requirement of the customer entity or its network 102. A QoS requirement may include one or more of a transport capacity, latency, packet loss, packet loss rate, bandwidth, priority, data associated with a service matrix, or any other QoS requirement.

At step 304, method 300 may also include receiving a request for a second service from the network customer. For example, the request may be generated by or otherwise related to customer entity network 102. For example, the request may be received from virtual ESF 134. The request may indicate that the second service be adjusted, removed from, provided to, or installed on customer entity network 102. The request may identify or indicate a provider of the service. The request may further identify an application or content.

At step 306, method 300 may include determining a QoS requirement based on the metadata and a provider of at least one of the first service or the second service. For example, this may include determining a first QoS requirement associated with the provider of the first or second service. Then, this QoS requirement may be adjusted based on the metadata. For example, a QoS requirement of the network customer may be greater than the QoS requirement of the provider, and the QoS at which the request will be answered may depend on these factors.

At step 308, method 300 may include adjusting network resource 148 based on the QoS requirement. Adjusting a network resource may include adjusting the allocation of memory, processing power, or other resources to the network customer or to another customer. Adjusting the network resource may be further based on policy and charging rules function (PCRF) data or similar data associated with the network customer, the provider, the application, the service, or the content. The network resource may belong to a multiprotocol label switching (MPLS) network, such as backbone network 108. Network resource 148 may facilitate the provision of the second service to the network customer.

Referring back to the devices of ESP 104, in some embodiments, the components of ESP 104 may perform various functions that facilitate instantiation of virtual ESP 134 or provide services to the customer entity network 102. Device manager 112 may manage aspects of one or more services or subscriber devices provided by the service provider to the customer entity. Device manager 112 may manage the devices and the services to the devices wirelessly or via wired network. For example, in some embodiments, the service provider may provide a defined number of mobile phones to a customer entity. In lieu of providing the customer entity with additional hardware or software on-site at the customer entity premises to manage the device, device manager 112 may manage the device or services to the device wirelessly or via wired network from device manager 112.

Provisioning device 114 (or a local version of the provisioning device at virtual ESP 134) may provision one or more services to subscriber device 130 for which a request for service provisioning is made via interface portal 132. For example, when installing services for a particular functionality, the devices that receive the service may be further provisioned once the service is installed. By way of example, but not limitation, a video service may be installed on SIM cards of entities associated with a customer entity. Provisioning device 114 may add functionality (e.g., premium functionality) to the service for selected devices specified in the request for service. The provisioning may be performed over the network to the one or more subscriber devices 130. As such, the installation of the premium service may be completed more quickly. Further, this installation may be initiated based on a single online request initiated from customer entity network 102.

Hosting device 116 (or a local version of the hosting device at virtual ESP 134) may provide additional services to existing services as well. Hosting device 116 may add specific features to video services for selected devices. For example, hosting device 116 may add conferencing to video services or provide prioritized connectivity or bandwidth for different devices. As such, hosting device 116 may provide tailored services on top of the standard services to customer entities.

Customer entity data storage 128 may be configured with database functionality or store information comprising, but not limited to, application data, device user profile information, or information about devices for which installation, removal or provisioning of additional services may be performed or the like. As such, the customer entity, or devices associated with customer entity network 102 or the customer entity, may gather information from one or more subscribers or devices (e.g., phones, sensor devices in assembly line or digital home environments) of one or more subscribers. Customer entity data storage 128 may store the information gathered to enable the information to be further processed or used. Customer entity data storage 128 may store application data or information generated by the device (e.g., sensor generates information indicated a part used on the assembly line being monitored is low in quantity). Customer entity data storage 128 may store the device generated data in the customer entity premises or the user information for one or more subscriber devices 130 generated by the application, a device or sensor employed in an application, or the like.

In various embodiments, a local version of customer entity data storage may be provided at virtual ESP 134 and may store information for only the customer entity (while customer entity data storage 128 may store information for multiple customer entities).

Security device 118 may secure the information stored in the customer entity data storage 128. For example, since ESP 104 is a multi-tenant ESP that may service or store information for multiple customer entities, security device 118 may implement one or more security rules or policies associated with, processed by, or stored in policy device 120 about how the customer entity has approved access to information associated with the customer entity, devices, subscribers, applications, or sensors of the customer entity.

The operation of security device 118 and policy device 120 may be tailored to the specifications desired by the particular customer entity. For example, security device 118 and policy device 120 may be tailored for a particular customer entity by security device 118 or policy device 120 processing or executing operations with regard to communications monitored, and they may ensure the information associated with a particular customer entity is only able to be accessed in the customer entity data storage 128 by that specific customer entity.

Policy device 120 may implement policies with regard to how ESP 104 or virtual ESP 134 may be utilized. For example, a customer entity with international locations may have one or more policies that restrict or define access to the customer entity information based on the location of the particular network. By way of example, but not limitation, a policy may be stored in policy device 120 or executed by policy device 120 that restricts or mandates that only traffic local to a particular network that comes from ESP 104 or virtual ESP 134 be transmitted to the network in this particular geographical area. Accordingly, information such as what entities may access the customer entity information (e.g. whether and which third-party carriers or vendors may access the customer entity information) and when the access is allowed may be stored in or implemented via policy device 120.

A local version of the security device at virtual ESP 134 may secure the information stored in the local customer entity data storage. A local version of the policy device may be stored at virtual ESP 134 and work in conjunction with security device 118 to perform one or more operations for access to customer entity information according to the customer entity policies.

ESP 104 or backbone network 108 may include memory 122. Memory 122 may be a computer-readable storage medium storing computer-executable instructions or information configured to perform one or more of the functions described herein with reference to services provider network 106 (or any component thereof), such as evaluating security, policy, and customer entity services request information and determining the APIs to transmit to customer entity devices 130. Although not shown, in various embodiments, virtual ESP 134 may also include local versions of memory, processors and the like.

Communication device 126 may transmit or receive information between ESP 104, customer entity network 102, virtual ESP 134, backbone network 108, or the like. By way of example, but not limitation, communication device 126 may transmit or receive APIs, information indicative of a request for instantiation or modification of virtual ESP 134, service provisioning, content, or the like from the customer entity network 102. In some embodiments, communication device 126 may transmit a request for a particular API to be employed for service provisioning based on a request received from customer entity network 102. There may be a local version of communication device 126, such as interface portal 132 or a separate device.

Accordingly, in one or more embodiments, system 100 may process an online customer entity request for a virtualized ESP system, instantiate one or more virtualized ESP systems at customer entity network 102 based on the request, conditions, or number of customer entity subscribers 130 or the like, on a single customer entity device 130 (e.g., x86 processor) via customer entity network 102. Instantiation may be performed the same day as the request is received from customer entity network 102, such as within five minutes after the request is received from customer entity network 102 at service provider network 102. As such, the request may be processed on-demand or in substantially real-time. Virtual ESP 132 may include the functionality of ESP 104 or the functionality of a subset of ESP 104.

Further, in some embodiments, systems 100 may process requests from customer entity network 102 for service provisioning. The service provisioning may be performed for the entire customer entity network 102 or one or more customer entity devices 130. Service provisioning may include adding or removing one or more services, removing one or more services, tailoring one or more existing services for specific subscriber devices to implement different levels of service, or the like.

While the embodiments have been described herein as providing service to different businesses, services may be instantiated for individual consumers as well (e.g., smart homes). These devices may be stored in the customer entity data storage and may use any device to access the information generated by the smart home network (e.g., as opposed to using only a single device, such as a FITBIT® device, to receive information from the one or more devices in the smart home network).

Figure 4:
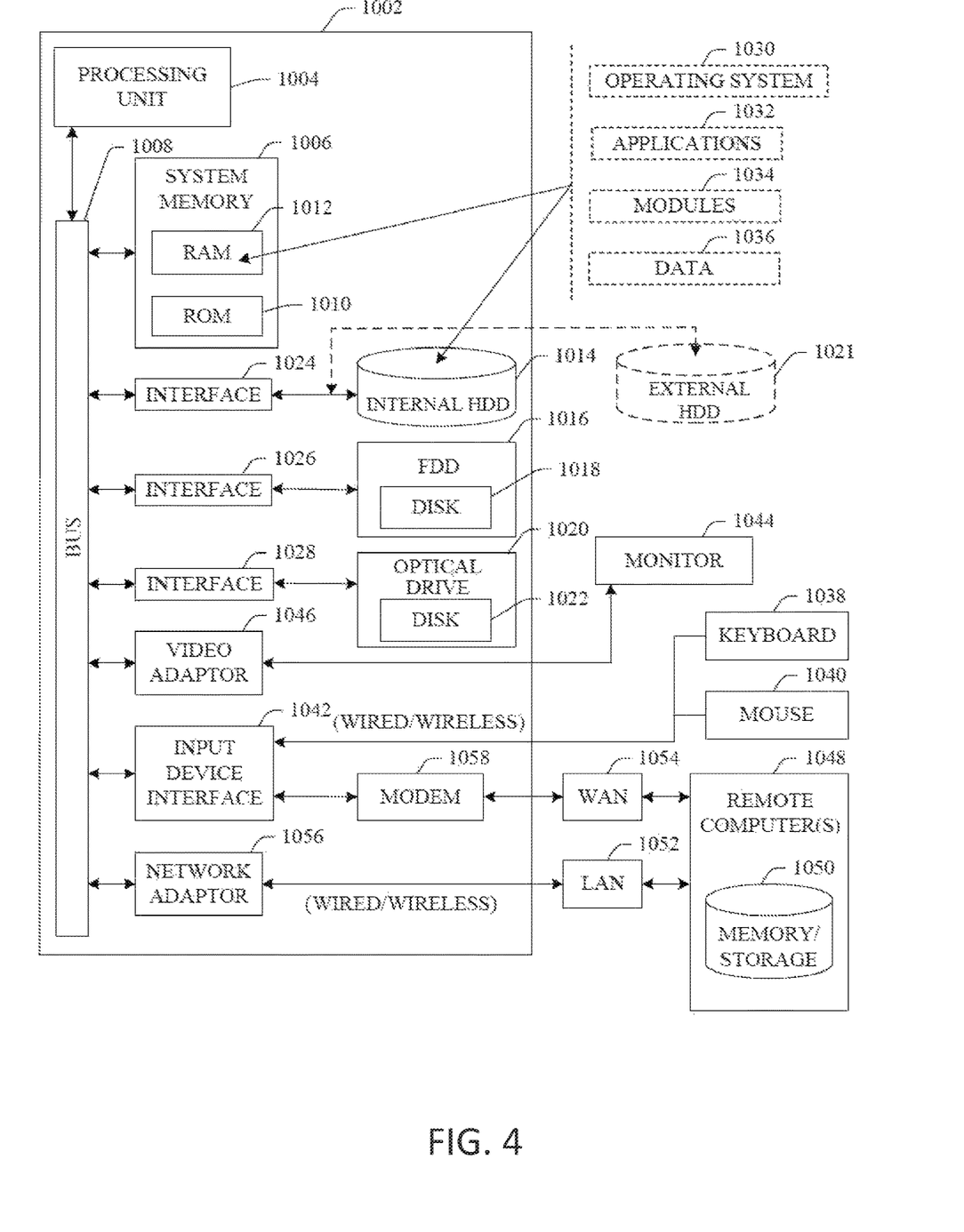
FIG. 4 illustrates a block diagram of a computer that may be employed in accordance with one or more embodiments.

FIG. 4 illustrates an example block diagram of customer entity data storage 128. Customer entity data storage 128 may comprise a number of different types of information, such as customer entity identity information 402 identifying the customer entity or customer entity devices, information about and generated by an assembly line service instantiated at the customer entity location, information about and generated by the fleet management service (e.g., identifiers of machinery within a fleet, location or tracking information for the machinery in the fleet), voice-over-IP services information, or travel services information.

In order to provide additional text for various embodiments described herein, FIG. 4 and the following discussion are intended to provide a brief, general description of a suitable computing environment 1000 in which the various embodiments of the embodiment described herein may be implemented. While the embodiments have been described above in the general context of computer-executable instructions that may run on one or more computers, those skilled in the art will recognize that the embodiments may be also implemented in combination with other program modules or as a combination of hardware and software.

Generally, program modules comprise routines, programs, components, data structures, etc., that perform particular tasks or implement particular abstract data types. Moreover, those skilled in the art will appreciate that the inventive methods may be practiced with other computer system configurations, comprising single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein may be also practiced in distributed computing environments where certain tasks are performed by remote processing devices that are linked through a communications network. In a distributed computing environment, program modules may be located in both local and remote memory storage devices.

Computing devices typically comprise a variety of media, which may include computer-readable storage media or communications media, which two terms are used herein differently from one another as follows. Computer-readable storage media may be any available storage media that may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data or unstructured data. Tangible or non-transitory computer-readable storage media may include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices or other media that may be used to store desired information. Computer-readable storage media may be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 4, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 may be any of various commercially available processors. Dual microprocessors and other multiprocessor architectures may also be employed as the processing unit 1004.

The system bus 1008 may be any of several types of bus structure that may further interconnect to a memory bus (with or without a memory controller), a peripheral bus, and a local bus using any of a variety of commercially available bus architectures. The system memory 1006 includes ROM 1010 and RAM 1012. A basic input/output system (BIOS) may be stored in a non-volatile memory such as ROM, erasable programmable read only memory (EPROM), EEPROM, which BIOS contains the basic routines that help to transfer information between elements within the computer 1002, such as during startup. The RAM 1012 may also include a high-speed RAM such as static RAM for caching data.

The computer 1002 further includes an internal hard disk drive (HDD) 1010 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 may be connected to the system bus 1008 by a hard disk drive interface 1024, a magnetic disk drive interface 1026 and an optical drive interface, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, may also be used in the example operating environment, and further, that any such storage media may contain computer-executable instructions for performing the methods described herein.

A number of program modules may be stored in the drives and RAM 1012, including an operating system 1030, one or more application programs 1032, other program modules 1034 and program data 1036. All or portions of the operating system, applications, modules, or data may also be cached in the RAM 1012. The systems and methods described herein may be implemented utilizing various commercially available operating systems or combinations of operating systems.

A communication device may enter commands and information into the computer 1002 through one or more wired/wireless input devices, e.g., a keyboard 1038 and a pointing device, such as a mouse 1040. Other input devices (not shown) may include a microphone, an infrared (IR) remote control, a joystick, a game pad, a stylus pen, touch screen or the like. These and other input devices are often connected to the processing unit 1004 through an input device interface 1042 that may be coupled to the system bus 1008, but may be connected by other interfaces, such as a parallel port, an IEEE 1394 serial port, a game port, a universal serial bus (USB) port, an IR interface, etc.

A monitor 1044 or other type of display device may be also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired or wireless communications to one or more remote computers, such as a remote computer(s) 1048. The remote computer(s) 1048 may be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 may be connected to the local network 1052 through a wired or wireless communication network interface or adapter 1056. The adapter 1056 may facilitate wired or wireless communication to the LAN 1052, which may also include a wireless AP disposed thereon for communicating with the wireless adapter 1056.

When used in a WAN networking environment, the computer 1002 may include a modem 1058 or may be connected to a communications server on the WAN 1054 or has other means for establishing communications over the WAN 1054, such as by way of the Internet. The modem 1058, which may be internal or external and a wired or wireless device, may be connected to the system bus 1008 via the input device interface 1042. In a networked environment, program modules depicted relative to the computer 1002 or portions thereof, may be stored in the remote memory/storage device 1050. It will be appreciated that the network connections shown are example and other means of establishing a communications link between the computers may be used.

The computer 1002 may be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, restroom), and telephone. This may include Wireless Fidelity (Wi-Fi) and BLUETOOTH® wireless technologies. Thus, the communication may be a defined structure as with a conventional network or simply an ad hoc communication between at least two devices.

Wi-Fi may allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network may be used to connect computers to each other, to the Internet, and to wired networks (which may use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks may provide real-world performance similar to the basic 10 Base T wired Ethernet networks used in many offices.

The embodiments described herein may employ artificial intelligence (AI) to facilitate automating one or more features described herein. The embodiments (e.g., in connection with automatically identifying acquired cell sites that provide a maximum value/benefit after addition to an existing communication network) may employ various AI-based schemes for carrying out various embodiments thereof. Moreover, the classifier may be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification may employ a probabilistic or statistical-based analysis (e.g., factoring into the analysis utilities and costs) to prognose or infer an action that a communication device desires to be automatically performed. A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence may be employed. Classification as used herein also is inclusive of statistical regression that is utilized to develop models of priority.

As will be readily appreciated, one or more of the embodiments may employ classifiers that are explicitly trained (e.g., via a generic training data) as well as implicitly trained (e.g., via observing communication device behavior, operator preferences, historical information, receiving extrinsic information). For example, SVMs may be configured via a learning or training phase within a classifier constructor and feature selection module. Thus, the classifier(s) may be used to automatically learn and perform a number of functions, including but not limited to determining according to a predetermined criteria which of the acquired cell sites will benefit a maximum number of subscribers or which of the acquired cell sites will add minimum value to the existing communication network coverage, etc.

As employed herein, the term "processor" may refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor may refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors may exploit nano-scale architectures such as, but not limited to, molecular and quantum-dot based transistors, switches and gates, in order to optimize space usage or enhance performance of communication device equipment. A processor may also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein may be either volatile memory or nonvolatile memory or may include both volatile and nonvolatile memory.

Memory disclosed herein may include volatile memory or nonvolatile memory or may include both volatile and non-volatile memory. By way of illustration, and not limitation, nonvolatile memory may include read only memory (ROM), programmable ROM (PROM), electrically programmable ROM (EPROM), electrically erasable PROM (EEPROM) or flash memory. Volatile memory may include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a network resource;
   a resource controller comprising a processor, the resource controller communicatively coupled to the network resource;
   a metadata exchange storing metadata associated with a network customer, the metadata comprising data exchanged between a customer entity network of the network customer and a service provider network and the metadata exchange communicatively coupled to the resource controller; and
   memory storing executable instructions that when executed by the processor cause the processor to effectuate operations, the operations comprising:
      receiving, by an enterprise service platform (ESP) of the service provider network comprising a backbone network, via a virtual ESP of the network customer, a request from the network customer;
      identifying a first metadata of the metadata based on at least an identity of the network customer;
      determining a quality-of-service requirement based on the request and the first metadata; and
      adjusting the network resource based on the quality-of-service requirement, wherein adjusting the network resource based on the quality-of-service requirement comprises adjusting an allocation of memory of the network resource based on the quality-of-service requirement.

2. The system of claim 1, wherein the network resource facilitates delivery of at least one of an application, a service, or a content indicated by the request to the network customer.

3. The system of claim 2, the operations further comprising:
   detecting a network change; and
   adjusting a second network resource during provision of the at least one of the application, the service, or the content by the network resource.

4. The system of claim 1, wherein determining the quality-of-service requirement comprises:
   determining a first quality-of-service requirement associated with the request; and
   adjusting the first quality-of-service requirement based on the metadata.

5. The system of claim 4, wherein the first quality-of-service requirement is based on a provider, wherein the request identifies at least one of an application, a service, or a content to be provided to the network customer by the provider.

6. The system of claim 1, wherein adjusting the network resource is further based on policy and charging rules function (PCRF) data.

7. The system of claim 1, wherein the network resource is a resource of a multiprotocol label switching (MPLS) network.

8. The system of claim 1, wherein the first metadata comprises at least one of a preference of the network customer, a user-defined policy rule, a service-level agreement, a first quality-of-service requirement associated with the network customer, a location, or a time.

9. A method comprising:
receiving, by an enterprise service platform (ESP) of a service provider network comprising a backbone network via a virtual ESP of a network customer, a request from the network customer;
identifying metadata based on at least an identity of the network customer, the metadata comprising data exchanged between a customer entity network of the network customer and a service provider network;
determining a quality-of-service requirement based on the request and the metadata; and
adjusting a network resource based on the quality-of-service requirement, wherein adjusting the network resource based on the quality-of-service requirement comprises adjusting an allocation of memory of the network resource based on the quality-of-service requirement.

10. The method of claim 9, further comprising:
detecting a network change; and
adjusting a second network resource during provision of the at least one of an application, a service, or content by the network resource.

11. The method of claim 9, wherein adjusting the network resource comprises changing at least one of a transport capacity, a latency, or a service matrix.

12. The method of claim 9, wherein the network resource facilitates provision of at least one of a content, an application, or a service in response to the request.

13. The method of claim 9, wherein the quality-of-service requirement includes at least one of a latency requirement, a bandwidth requirement, or a packet loss requirement.

14. A method comprising:
exchanging metadata with a network customer during a first provision of a first service to the network customer, the metadata comprising data exchanged between a customer entity network of the network customer and a service provider network;
receiving, by an enterprise service platform (ESP) of the service provider network comprising a backbone network, via a virtual ESP of the network customer, a request for a second service from the network customer;
determining a quality-of-service requirement based on the metadata and a provider of at least one of the first service or the second service; and
adjusting a network resource based on the quality-of-service requirement, wherein the network resource facilitates a second provision of the second service to the network customer, wherein adjusting the network resource based on the quality-of-service requirement comprises adjusting an allocation of memory of the network resource based on the quality-of-service requirement.

15. The method of claim 14, wherein the quality-of-service requirement includes at least one of a latency requirement, a bandwidth requirement, or a packet loss requirement.

16. The method of claim 14, wherein the network resource is a resource of a multiprotocol label switching (MPLS) network.

17. The method of claim 14, wherein the metadata comprises at least one of a preference of the network customer, a user-defined rule, a service-level agreement, or a second quality-of-service requirement of the network customer.

18. The method of claim 14, wherein the network customer is an enterprise customer.

* * * * *